F. E. JUDD.
CONTROLLING MECHANISM FOR THROTTLE VALVES.
APPLICATION FILED SEPT. 8, 1914.
1,139,685.
Patented May 18, 1915.
2 SHEETS—SHEET 1.
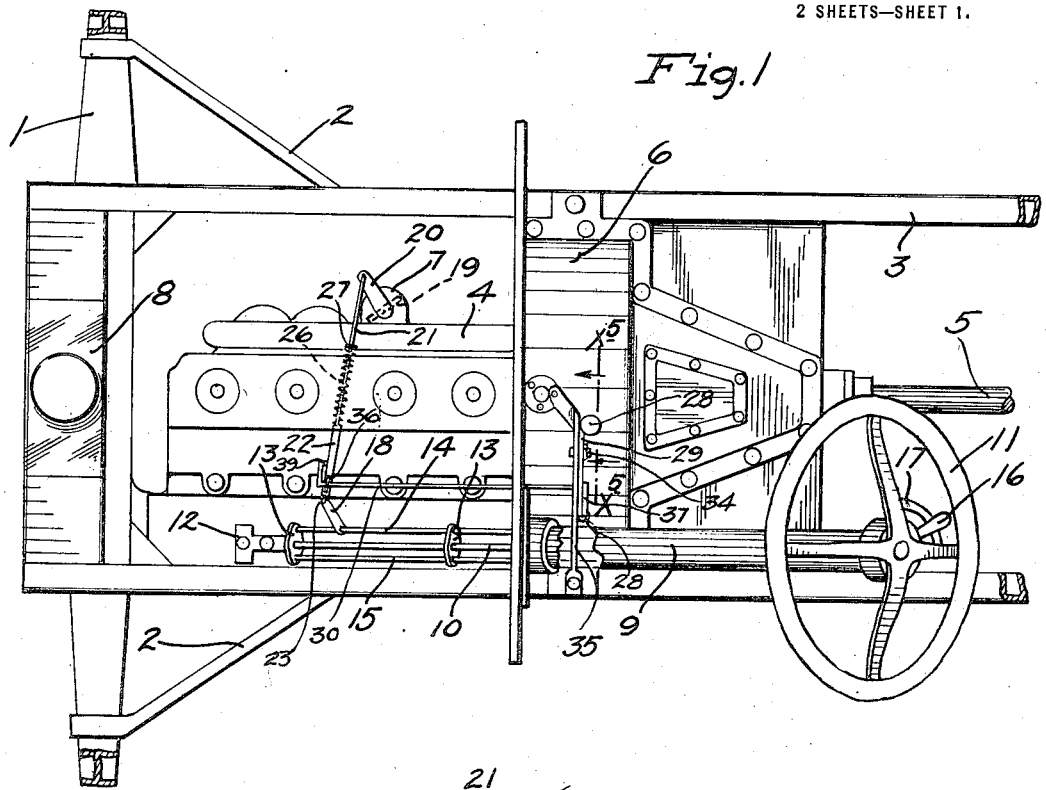
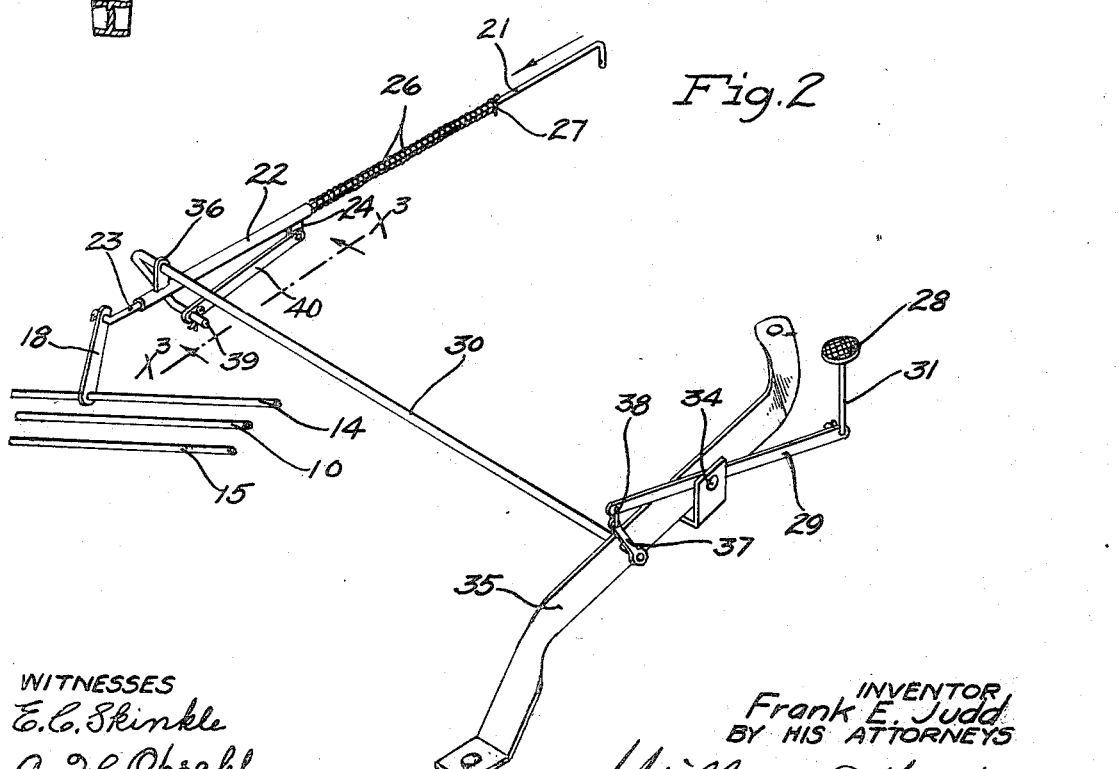
WITNESSES
E. C. Skinkle
A. H. Opsahl
INVENTOR
Frank E. Judd
BY HIS ATTORNEYS
Williamson Merchant

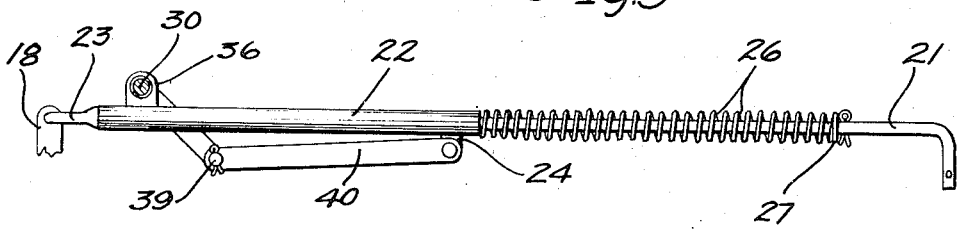
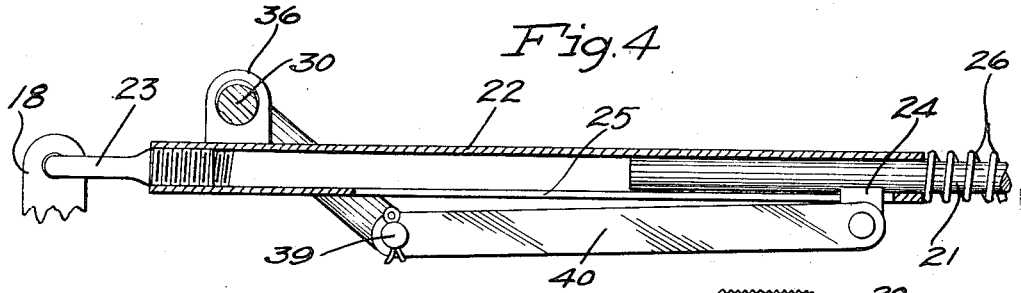
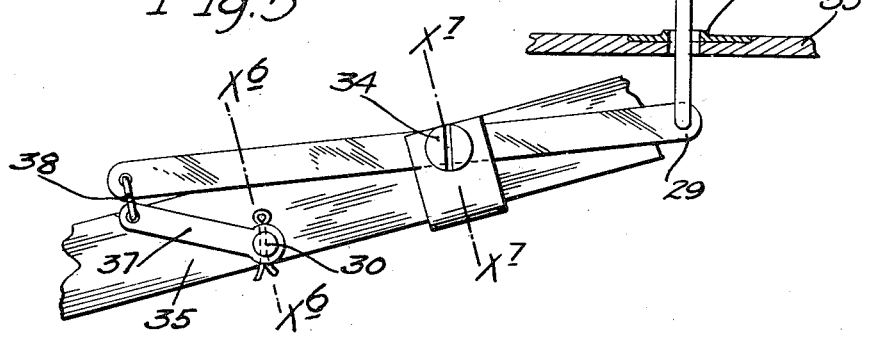
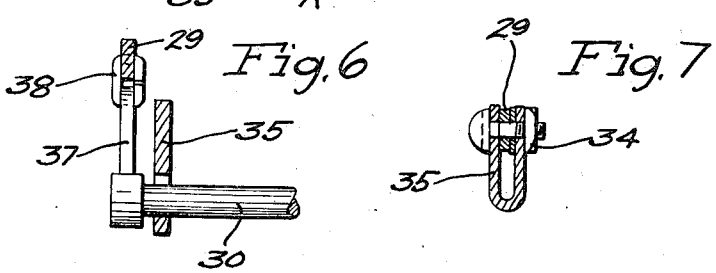
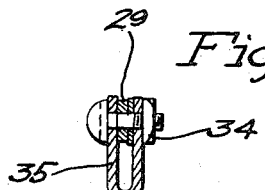

UNITED STATES PATENT OFFICE.

FRANK E. JUDD, OF WINDOM, MINNESOTA.

CONTROLLING MECHANISM FOR THROTTLE-VALVES.

1,139,685.    Specification of Letters Patent.    Patented May 18, 1915.

Application filed September 8, 1914. Serial No. 860,503.

*To all whom it may concern:*

Be it known that I, FRANK E. JUDD, citizen of the United States, residing at Windom, in the county of Cottonwood and State of Minnesota, have invented certain new and useful Improvements in Controlling Mechanism for Throttle-Valves; and I do hereby declare the following to be a full, clear, and exact description of the invention, such as will enable others skilled in the art to which it appertains to make and use the same.

My invention has for its object to provide mechanism for controlling the throttle valves of motor driven vehicles, which mechanism may be controlled either by hand or foot power.

To the above end, the invention consists of the novel devices and combinations of devices hereinafter described and defined in the claims.

In the accompanying drawings, which illustrate the invention, like characters indicate like parts throughout the several views.

Referring to the drawings, Figure 1 is a plan view of an automobile, having incorporated therein the invention, with some parts removed, some parts broken away, and some of the exposed parts being shown in section; Fig. 2 is a perspective view of a portion of the throttle valve controlling mechanism; Fig. 3 is a view partly in elevation and partly in section, taken on the line $x^3$ $x^3$ of Fig. 2, on an enlarged scale; Fig. 4 is a view corresponding to Fig. 3, but on a somewhat larger scale, with some parts broken away and with some parts shown in longitudinal central section; Fig. 5 is a detail view, partly in elevation and partly in section, taken in the vicinity of the line $x^5$ $x^5$ of Fig. 1, on an enlarged scale; Fig. 6 is a detail view, partly in elevation and partly in section, taken on the line $x^6$ $x^6$ of Fig. 5; and Fig. 7 is a detail view, partly in elevation and partly in section, taken on the line $x^7$ $x^7$ of Fig. 5.

For the purpose of illustrating the invention applied in working position, a portion of a Ford automobile has been illustrated in the drawings. Of the parts of this automobile it is necessary to note only the front axle 1, radius rods 2, frame 3, explosive engine 4, engine shaft 5, gear casing 6, carbureter casing 7 and radiator 8. Of the steering mechanism of the automobile illustrated it is important to note the steering post 9 having mounted therein the steering rod 10, having at its upper end a steering wheel 11 and journaled at its lower end in a bearing 12. Loosely mounted on the steering rod 10, below the steering post 9, is a pair of vertically spaced disks 13. Journaled in these disks 13 are the customary gas rod 14 and spark rod 15. The gas rod 14 is oscillated by the customary hand piece 16 and is held in different set positions by a lock segment 17. Keyed to the gas rod 14, between the disks 13, is a crank arm 18. For the purpose of this case it will not be necessary to illustrate the means for operating the spark rod 15. Within the carbureter casing 7 is mounted the customary butterfly throttle valve 19, having secured to its shaft a crank arm 20. The customary rigid rod connection between the crank arms 18 and 20 is not illustrated, but is supplemented by a part which will presently be described. The parts thus far described may be of the standard or any desired construction.

In place of the rigid rod connection between the crank arms 18 and 20 is employed a longitudinally extensible and contractable rod, comprising a primary section 21 and a secondary section 22, the former being telescoped into the latter. The outer end of the rod section 21 is pivotally secured to the free end of the crank arm 20 for substantially horizontal swinging movement, and for endwise sliding movement in the rod section 22. The outer end of the rod section 22 is pivotally secured to the free end of the crank arm 18 by a hook-like extension 23, screwed into said rod section. Rigidly secured to the rod section 21 is a laterally projecting lug 24 which slidably works in a longitudinally extended slot 25 formed in the rod section 22 and affords a stop to limit the longitudinal separation of the rod sections. A coiled spring 26 is telescoped onto the rod section 21, compressed between a collar 27 thereon, and the inner end of the rod section 22, and yieldingly holds said sections in their extended positions. Obviously, the rod sections 21 and 22 complete the connection between the hand piece 16 and throttle valve 19.

To manipulate the hand piece 16 it is necessary for the driver to take one of his hands off from the steering wheel 11, thereby often causing him to lose control of the machine. To overcome this danger I provide a foot-actuated mechanism by which the throttle valve 19 may be actuated independently of the hand piece 16. In its preferred form this foot-actuating mechanism comprises a foot treadle 28, lever 29, and rock shaft 30. The treadle 28 is provided with a depending stem 31 which works through a perforated plate 32 in the foot board 33 of the automobile floor and is pivotally secured to one end of the lever 29. The lever 29 is intermediately fulcrumed at 34 to a bracket 35, rigidly secured to the gear casing 6 and frame 3. The rock shaft 30 is journaled in the bracket 35 and a bearing lug 36 rigidly secured to the rod section 22. One end of this rock shaft 30 is provided with a crank arm, 37, which, at its free end, is connected by a link 38 to the lever 29, at the opposite end from the treadle 28. The other end of the rock shaft 30 is bent laterally downward and then upon itself to afford a crank extension 39, which is connected to the lug 24 by a link 40.

The arrangement of the connections between the foot treadle 28 and throttle valve 19 is such that by a downward pressure on said treadle the throttle valve 19 is opened. This downward movement of the treadle 28 compresses the spring 26 and moves the primary rod section 21 telescopically into the secondary rod section 22. When the pressure on the foot treadle 28 is released the spring 26 again returns the several connections to their normal positions. From the foregoing description it is evident that by manipulating the foot treadle 28 the throttle valve 19 may be opened and closed at will independently of the hand-actuated mechanism. The independent movement of the foot-actuated mechanism may take place when the throttle valve 19 is held closed by the hand-actuated mechanism, or when the throttle valve is partly open and the hand piece 16 locked in a predetermined set position.

The above described mechanism, has, in actual usage, proven highly satisfactory for the purpose had in view.

What I claim is:

1. The combination with the throttle valve of an explosive engine, said valve having a crank, of a hand-controlled rod having a crank, a longitudinally extensible connection between said two cranks, a spring tending to hold said connection extended, and a foot controlled device for actuating said throttle valve independently of said hand-controlled rod.

2. The combination with the crank-equipped throttle valve of an explosive engine, of a hand-controlled rod having a crank, a longitudinally extensible connection between said two cranks, a spring tending to hold said connections extended, and a foot-controlled device operative on said connection to contract the same, against the tension of said spring, and thereby actuate said throttle valve independently of said hand-controlled rod.

3. The combination with the crank-equipped throttle valve of an explosive engine, of a hand-controlled rod having a crank, a connecting rod comprising telescopically-connected primary and secondary sections, the primary section of said rod being secured to the crank of said throttle valve, the secondary section of said rod being secured to the crank of said hand controlled rod, a spring tending to separate the sections of said rod, and a foot-controlled device, operative on the primary section of said rod, to move the same against the tension of said spring and thereby actuate said throttle valve, independently of said hand-controlled rod.

In testimony whereof I affix my signature in presence of two witnesses.

FRANK E. JUDD.

Witnesses:
M. C. LANGLEY,
JNO. J. PERRY.